United States Patent
Ackermann et al.

(10) Patent No.: US 8,470,949 B2
(45) Date of Patent: Jun. 25, 2013

(54) NON-YELLOWING LOW VOC MINERAL SURFACE ENHANCER

(75) Inventors: Hartmut Ackermann, Burghausen (DE); Daniel J. Mania, Saline, MI (US); Richard L. Kirkpatrick, Saline, MI (US); Mike Coffey, Adrian, MI (US)

(73) Assignee: Wacker Chemical Corporation, Adrian, MI (US)

( * ) Notice: Subject to any disclaimer, the term of this patent is extended or adjusted under 35 U.S.C. 154(b) by 17 days.

(21) Appl. No.: 13/193,000

(22) Filed: Jul. 28, 2011

(65) Prior Publication Data

US 2013/0030114 A1    Jan. 31, 2013

(51) Int. Cl.
*C08G 77/08* (2006.01)
(52) U.S. Cl.
USPC ........... 528/21; 528/23; 528/38; 528/17; 528/18; 106/287.11

(58) Field of Classification Search
USPC ........... 528/17, 18, 21, 23, 38; 106/287.11
See application file for complete search history.

(56) References Cited

U.S. PATENT DOCUMENTS

| 4,988,470 A | 1/1991 | Demlehner et al. |
| 2003/0211063 A1* | 11/2003 | Wrolson et al. ........... 424/70.12 |
| 2010/0239771 A1* | 9/2010 | Liu et al. ................. 427/387 |

FOREIGN PATENT DOCUMENTS

WO    2008/134243    * 11/2008

* cited by examiner

*Primary Examiner* — Margaret Moore
(74) *Attorney, Agent, or Firm* — Brooks Kushman P.C.

(57) ABSTRACT

Low VOC mineral surface enhancer compositions are non-yellowing and contain a condensable aminoorgano-functional organopolysiloxane fluid, a condensable organopolysiloxane resin, and a condensation catalyst. The compositions provide a durable, color enhancing wet look to mineral surfaces to which they are applied.

20 Claims, No Drawings

NON-YELLOWING LOW VOC MINERAL SURFACE ENHANCER

BACKGROUND OF THE INVENTION

1. Field of the Invention

The invention pertains to mineral surface enhancers containing organopolysiloxanes with low levels of volatile organic compounds, and which do not cause yellowing.

2. Background Art

Numerous hard surfaces require surface enhancement. Examples of these are kitchen countertops, bathroom countertops, ceramic and stone flooring and wall tiles, etc. Surface enhancement achieves a number of diverse purposes, including imparting hydrophobicity to minimize water absorption, imparting stain resistance, to lower surface roughness, to obtain a "wet look," and to accentuate the natural color of the mineral substrate. Past treatments have employed a variety of oils and waxes, including silicone oils, and a number of natural and synthetic waxes. However, the degree of surface enhancement has been limited with such materials.

It is often desired, for example, to impart a wet look finish, for instance on marble or granite products. Oils and waxes can provide this function, but oils have a tendency to streak or leave marks following application, and the degree of protection offered by waxes is limited and may change with time as the wax slowly oxidizes. Wax may build up a result of multiple coatings, and in the worst case, may flake or scale. This separation from the surface may be exacerbated due to a lack of adhesion to the surface as well. Such products may also yellow over time, changing the color of the substrate.

Many wax and oil formulations also contain volatile organic solvents to reduce their viscosity and/or aid in ease of application. These solvents are liberated in the application process, and are considered environmentally suspect.

It would be desirable to provide a hard surface enhancer compositions which contains minimal volatile compounds which may be viewed as VOCs, which provide a hydrophobic surface, which adhere strongly to the surfaces to be treated, which do not yellow over time, and which accentuate the depth of color of the substrate.

SUMMARY OF THE INVENTION

It has now been surprisingly and unexpectedly discovered that a blend of specially prepared aminoalkyl-functional organopolysiloxane fluids bearing condensable groups, an organopolysiloxane resin bearing condensable groups, a condensation catalyst, and optionally a low viscosity organopolysiloxane fluid, can simultaneously provide high levels of gloss and hydrophobicity and strong surface adherence to mineral surfaces without high levels of VOCs, and without yellowing. The compositions cure on the surface to produce a robust surface enhancing film.

DETAILED DESCRIPTION OF THE PREFERRED EMBODIMENTS

The mineral surface enhancers may be applied to any mineral surface in need of enhancement. While preferably intended for mineral surfaces such as granite, marble, slate, limestone, and concrete, etc., the enhancer may also be applied with good results to other surfaces such as highly mineral filled polymer compositions commonly used for solid surfaces in bathrooms and kitchens. The mineral surface treatment compositions enhance color and visual appearance. A wet look is easily achieved by application, and repeated applications can provide a glossy finish.

The enhancers of the present invention are applied to the mineral surface and cure thereon. The degree of penetration into the surface is dependent primarily on the porosity and smoothness of the surface. For surfaces which are smooth and essentially non-porous, as are some varieties of granite, the composition may form a thin, virtually continuous surface film. For other varieties of granite, where the generally smooth surface has irregular pores, pits, and the like, the enhancer may enter these, partially or fully filling them, providing not only a visually enhanced surface, but a smoother surface as well. In porous products such as some marbles and limestones, considerable pore filling may result. In any case, a smoother, more homogenous and in general more aesthetic surface results, one which is more hydrophobic than the original surface, resistant to yellowing over time, and one which enhances the natural color of the surface.

The amino-functional fluids used in the subject invention provide for high adhesion. However, the use of amino-functional fluids for this purpose would be contraindicated by the well-known fact that such fluids are subject to severe yellowing, which would be expected to alter the color of the substrate to which they are applied. Applicants have surprisingly and unexpectedly discovered that by suitable synthesis and formulation with the remaining ingredients, which includes a stripping operation, amino-functional fluids may be used which do not exhibit yellowing phenomena.

The amino-functional fluids are prepared by equilibration of an aminoalkyl-functional silane with a polydiorganosiloxane, preferably a cyclic organopolysiloxane, and most preferably a cyclic organopolysiloxane such as hexamethylcyclotrisiloxane, octamethylcyclotetrasiloxane, or higher analogs, in the presence of an equilibration catalyst. The catalyst used in the equilibration is a catalyst which can be deactivated thermally or one which is volatile and can be removed, e.g. by distillation, stripping with inert gas, through use of vacuum, or combinations of these techniques. Strongly basic conventional catalysts such as alkali metal hydroxides followed by neutralization are not useful. Examples of suitable catalysts include tetraorganoammonium hydroxides such as tetramethylammonium hydroxide, tetraethylammonium hydroxide, tetrapropylammonium hydroxide, tetrabutylammonium hydroxide, benzyltrimethylammonium hydroxide, and the corresponding phosphonium compounds. It is preferred that the product be distilled, stripped, and/or vacuum treated.

For removal of volatiles and catalyst residues, as mentioned previously, it is advantageous and sometimes necessary to treat the aminoorgano-functional fluid by distillation, stripping, or vacuum treatment. When distillation is used, short path distillation or falling film or wiped film evaporation are preferable, generally at atmospheric pressure or reduced pressure. Pressures of 10 mbar to 1 bar, more preferably 50 mbar to 1 bar are preferred, with temperatures preferably ranging from ambient, e.g. room temperature, to 200° C., more preferably 80° C. to 150° C. Higher or lower temperatures may also be utilized. Removal of volatiles by stripping is generally performed using nitrogen as the stripping gas, preferably either at atmospheric pressure or reduced pressure, at the temperature ranges cited above.

The amino-functional fluids generally contain one or more amino groups corresponding to the formula $$HRN-(R^1-NH)-R^2-$$

where R is hydrogen or a $C_{1-20}$ hydrocarbon group, preferably hydrogen or a $C_{1-4}$ alkyl group, and most preferably hydrogen or methyl, and $R^1$ and $R^2$ are divalent $C_{1-20}$ hydrocarbon groups optionally interrupted by non-adjacent N, O, or S atoms, or by keto, urea, or carbamate groups. $R^1$ is preferably a $C_{1-4}$ alkylene group, most preferably ethylene or propylene, and $R^2$ is preferably a $C_{1-18}$ hydrocarbon group, preferably a propylene group. A preferred amino group is the 3-(2-aminoethyl)-3-aminopropyl group. The amino-functional fluids generally contain from 1 to 10 of such aminoorgano groups, more preferably 1 to 3 of such groups. The amine equivalent weight may vary over a wide range, but is preferably from 0.1 to 5 meq/g, more preferably 0.5 to 3 meq/g, and most preferably about 1 to 2 meq/g.

The remaining organo groups of the amino-functional organopolysiloxane fluid may be any conventional organo groups known in organopolysiloxane chemistry, and are preferably alkyl, alkenyl, cycloalkyl, cycloalkenyl, aryl, alkaryl, or aralkyl groups with no more than 20 carbon atoms. Preferred organo groups are methyl groups, i.e. the majority of the siloxy repeating units are dimethylsiloxy units. However, for enhanced hydrophobicity, it may also be preferable for some of the organo groups to be long chain alkyl groups such as linear or branched $C_{6-20}$ alkyl groups, preferably $C_{12-20}$ alkyl groups, more preferably $C_{14-18}$ alkyl groups. The polydiorganosiloxane may, for example, be substantially methyl groups, with at least one group containing an aryl group or at least one $C_{6-20}$ alkyl group. Synthesis of such amino-functional organopolysiloxane fluids is well known. The methyl group is preferred.

The organosiloxane resin may be prepared by conventional methods, i.e. by the hydrolysis of chlorosilanes or alkoxysilanes, preferably the latter, and contains residual silicon bonded hydroxyl and/or alkoxy groups, preferably the latter. When chlorosilanes are hydrolyzed, the hydrolysis generally takes place in aqueous alcohol, which also introduces condensable alkoxy groups into the resin product. The alkoxysilanes used for the hydrolysis include trifunctional silanes ("T" units) such as methyltrimethoxysilane and methyltriethoxysilane, and tetrafunctional silanes ("Q" units) such as tetramethoxysilane and tetraethoxysilane. In particular to adjust molecular weight, monofunctional silanes ("M" units) such as trimethylmethoxysilane and trimethylethoxysilane may be used. If it is desired to impart some additional flexibility to the resin, difunctional silanes ("D" units) such as dimethyldimethoxysilane and dimethyldiethoxysilane may be used, however their use is not preferred, and when used, the amounts are generally less than 20 mol percent, more preferably less than 10 mol percent, and yet more preferably less than 5 mol percent, based on total mols of all silanes used. Preferably, no difunctional silanes are used.

The silicone resins are preferably liquid at room temperature, with a viscosity of 14 to 30 mPa·s, preferably 18 to 28 mPa·s, and most preferably 18 to 26 mPa·s. However, solid resins which are soluble in the amino-functional polydiorganosiloxane fluid may also be used. Furthermore, both liquid and solid resins may be used together, provided the latter are soluble in the enhancer composition. The preferred resin is a liquid, methyl, ethoxy resin as described in U.S. Pat. No. 4,988,470, which is incorporated herein by reference. This resin is a T resin which is preparable by hydrolysis of alkyltrichlorosilanes, preferably methyltrichlorosilane in aqueous ethanolic HCl, or by acid catalyzed hydrolysis of the corresponding alkoxysilanes, preferably methyltriethoxysilane.

As with the amino-functional organopolysiloxane fluids, organo groups Si-bonded to the organopolysiloxane resin are preferably lower alkyl groups, most preferably methyl groups. However, other organo groups as described previously with respect to the amino-functional fluids may also be used, although not preferred. The organopolysiloxane resins may also include aminoorgano groups, although this is also not preferred. Other organo groups which are non-reactive in the composition, e.g. which do not impair the storage stability or the ability to form a desirable degree of enhancement may also be present, although again, these are not preferred. Examples of such groups, which may also be present in the amino-functional fluid, include halogenated hydrocarbon groups, in particular fluorinated hydrocarbon groups. Such fluorinated groups such as perfluoroalkyl groups, can assist in providing oleophobicity in addition to hydrophobicity. The resins may contain an inadvertent small amount of silicon-bonded chlorine as a result of the preparation method used.

Resins are often characterized by the presence of the respective M, D, T, and Q units. Preferred resins of the subject invention are T resins, MT resins, MQ resins, and MQT resins. The alkoxy groups of the resins are preferably ethoxy groups, since the release of ethanol during cure is preferable over the release of methanol.

The resins of the invention preferably have molecular weights of 2000 to 4500 g/mol, more preferably 3000 to 3500 g/mol, and an alkoxy content of 5 to 40 weight percent, calculated on the basis of ethoxy groups, more preferably 5 to 20 weight percent.

The enhancer compositions contain the amino-functional fluid in an effective amount, relative to the resin, to promote surface adherence and curing. Preferably the weight ratio of amino-functional fluid to resin is 1:4 to 4:1, more preferably 3:7 to 7:3, yet more preferably 2:3 to 3:2, and most preferably about 1:1.

The enhancers of the invention also contain a curing catalyst. Any condensation catalyst suitable for the cure of condensation curable organopolysiloxanes may be used. Examples of such catalysts may be found in Walter Noll, The Chemistry and Technology of Silicones, Academic Press, ©1968, and in numerous patents and publications well known to those skilled in the art. Tin catalysts are one preferred group of catalysts, for example dibutyltin diacetate, dibutyltin dilaurate, and dioctyltin carboxylate. Titanium catalysts are more preferred, examples being titanium (IV) isopropoxide and titanium (IV) t-butoxide.

The enhancers may, depending upon the viscosities of the aminoorgano-functional fluid and organopolysiloxane resin combination, and further depending upon whether the product is desired to be a liquid, lotion, cream, etc., contain a low viscosity organopolysiloxane. The low viscosity organopolysiloxane has a viscosity which is usually considerably lower than the combination of aminoorgano-functional fluid and organopolysiloxane resin. Viscosities which are lower than 150 mPa·s are preferable, more preferably less than 50 mPa·s, and most preferably less than 20 mPa·s. A trimethylsilyl-terminated polydimethylsiloxane fluid AK 10, available from Wacker Chemical Corporation, Adrian, Mich., having a viscosity of ca. 10 mPa·s has been found very suitable, as has also hexamethyldisiloxane, with a viscosity of ca. 0.65 mPa·s. Low molecular weight, and hence low viscosity fluids having vinyldimethylsiloxy and other terminal groups, particularly reactive terminal groups such as dimethylsilanol and dimethylethoxysiloxy groups may also be used. Such silicone fluids are not considered when evaluating the level of VOCs.

When a viscosity reducer is used, it is in general used in amounts of 20 weight percent or less based on the total enhancer composition weight, more preferably 10 weight percent or less.

The composition may also contain additives in amounts less than 30 weight percent, preferably less than 20 weight percent, more preferably less than 10 weight percent, and most preferably less than 5 weight percent, based on the total weight of the enhancer composition. Examples of such additives include low viscosity volatile solvents such as paraffinic and aromatic hydrocarbons and their mixtures. These are preferably avoided altogether to minimize VOCs. However, VOC exempt solvents such as t-butylacetate, methyl acetate, dimethylcarbonate, propylene carbonate, and completely methylated cyclic polysiloxanes may be included. Further additives include high molecular weight soluble polyorganosiloxane fluids and gums, whose use is also not preferred, polar polyorganosiloxane urethane urea waxes, and conventional waxes such as carnauba wax or polyethylene wax. Again, these are not preferred. The compositions may also contain antioxidants such as sterically hindred aromatic amines and phenols, biocides, and UV absorbants. For compositions which are designed to impart color to a substrate, which is generally not desired, organic dyes and organic and inorganic pigments may be included.

The enhancer compositions of the invention have low VOC levels, less than 100 g/liter. By "VOCs" are meant compounds which participate in atmospheric photochemical reactions, as defined in 40 C.F.R. §51.100(s).

In use, the enhancer compositions may be sprayed onto the mineral substrate surface, for example with a hand-actuated sprayer or form a pressurized can sprayer, or may be applied as a liquid, lotion, or cream, generally by means of paper toweling or soft cloth, and rubbed into the surface. The humidity of the atmosphere is sufficient to promote the catalyzed cure of the composition. To prevent premature curing during storage, the compositions should be substantially free of water. To assure continued absence of water, water scavengers such as tri- and tetraalkoxysilanes, and carbamato silanes such as methylcarbamatomethyltrimethoxysilane, methylcarbamatomethyl-methyldiethoxysilane, and vinyltriethoxysilane, the latter being available from Wacker Chemie AG as Geniosil® XL63, Geniosil® XL65, and Geniosil® XL10. The amount of water scavenger is in general relatively low, preferably, less than 1% by weight of the total composition, more preferably less than 0.5% by weight, and most preferably less than 0.2% by weight. The water scavengers, when used, are added following stripping of the main components of the composition.

Enhancement of the surface may be determined visually or by tests known to those skilled in the art, for example standard tests of gloss and hydrophobicity. The products were applied to multiple types of substrates, including tumbled marble, tumbled limestone, saltillo tile, concrete, etc. After a 24 hour cure, staining agents such as ketchup, mustard, vegetable oil, vinegar, water, red wine, Coca-Cola®, etc. are applied, and remain on the substrate for a duration of four hours. The staining agents are then washed off using water and a commercially available tile cleaner. The stain repellency of the substrates are evaluated along with the enhancement properties after drying for 24 hours.

Yellowing may be assessed visually. Yellowing was assessed by placing the samples to be evaluated in front of a white background. A strong light source is employed to aid in the determination of the clarity/color of the samples was evaluated.

Having generally described this invention, a further understanding can be obtained by reference to certain specific examples which are provided herein for purposes of illustration only and are not intended to be limiting unless otherwise specified.

EXAMPLES

Comparative Example 1

1337 g of octamethylcyclotetrasiloxane was added to a 2 L flask and heated to 75° C. under vacuum to remove water, and then cooled to 50° C., when 267 g of N-(2-aminoethyl)-3-aminopropyltrimethoxysilane, available from Wacker Chemie AG as Geniosil® GF-91 was added, and the mixture stirred for 15 minutes. To the mixture at a temperature below 55° C. was added 0.3 g powdered KOH, and the mixture stirred for 15 minutes. The mixture was then heated to 135° C. under light vacuum and held at this temperature for 4 hours. The vacuum was removed, and 0.4 g of acetic acid was added and the mixture stirred for 15 minutes, followed by heating to 160° C. under vacuum for 2 hours. The aminoethylaminopropyl-functionalized polydimethylsiloxane product had an amine equivalent of 1.48 meq/g, a viscosity of 20.8 mPa·s, a specific gravity of 0.9830 and a silicone "solids" (polymer) content of 86.75 weight percent. The calculated VOC content was 130 g/L.

Example 1

In a manner similar to Comparative Example 1, 1061.54 g of octamethylcyclotetrasiloxane was mixed, after water removal, with 210.82 g of Geniosil® GF-91 for 1 minute, following which 0.79 g of tetrabutylammonium hydroxide was added and mixed for 1 minute. The mixture was heated to 135° C. and held for 4 hours under full vacuum. The temperature was then raised to 160° C. and held for 2 hours, then cooled to 35° C. and filtered. The aminoethylaminopropyl-functional polydimethylsiloxane had an amine equivalent of 1.87 meq/g, a viscosity of 52 mPa·s, a specific gravity of 0.9975, a solids content of 98.33 weight percent, and calculated VOC of 16 g/L.

Example 2

The procedure of Example 1 was used, with 833.54 g octamethylcyclotetrasiloxane, 166.46 g Geniosil® GF-91, and 0.56 g tetrabutylammonium hydroxide. Fifteen minutes of mixing time were used in each occurrence rather than the 1 minute of Example 2. The aminoethylaminopropyl-functionalized polydimethylsiloxane had an amine equivalent of 1.94 meq/g, a viscosity of 72 mPa·s, a specific gravity of 0.9997, a solids content of 99.6 weight percent, and calculated VOC of 4 g/L.

Example 3

A mineral surface enhancer was prepared as follows. 7.242 kg of tetramethylcyclotetrasiloxane was introduced into a 22 L flash equipped with a cold water condenser and heated to 50° C. for 1 hour. Full vacuum (60 torr pressure) was applied during this time, while the flask contents were stirred at approximately 250 rpm. The vacuum was let down and 1.438 kg of Geniosil® GF-91 fluid was added and the contents were mixed for 5 minutes, followed by addition of 5.37 g tetrabutylammonium hydroxide and a further 5 minutes of mixing. The temperature was raised to 135° C. and held for 2.5 hours with stirring, under vacuum (60 torr), with an $N_2$ sparge, and with the reflux path closed, and then heated to 160° C. and held for 1.5 hours with stirring under vacuum, $N_2$ sparge, and with the reflux path open.

The temperature was lowered to 100° C., and vacuum let down. To the aminoethylaminopropyl-functional polydimethylsiloxane product was then added 6.949 kg of an ethoxy-functional T resin prepared by hydrolysis of methyltrichlorosilane in a mixture of ethanol and aqueous HCl, having a viscosity of ca. 25 mPa·s. The resin has a general empirical formula of $CH_3Si(OC_2H_5)_{0.8}O_{1.1}$. The mixture was stirred and heated to 145° C. for 2 hours. Stripping was performed by first gradually applying a nitrogen sparge and vacuum, to prevent liquid from entering the condenser, until full vacuum (60 torr) was reached. The product was cooled to below 50° C., and sampled, and found to contain >100 g/L of VOCs. The product was reheated to 145° C. and further stripped between 145° C. and 100° C. for a total of about 5 hours. The resulting product was analyzed and found to have a viscosity of 40 cSt, a solids content of 90.43 weight percent, a specific gravity of 1.041, and calculated VOC of 99.38 g/L. To this product was added 5 weight percent of hexamethyldisiloxane, with a viscosity of 0.65 mPa·s, to lower the viscosity of the enhancer to 30 mPa·s. The product did not yellow with time, nor after applying to a mineral surface. The appearance of the surface was visually enhanced.

Comparative Example 2

A composition similar to that of Example 3 was prepared, but the synthesis of the aminoethylaminopropyl-functional polydimethylsiloxane was performed with KOH equilibration catalyst and acetic acid neutralization as in Comparative Example 1. The product was prepared by mixing 49.75 weight percent of the amino fluid, 49.75 weight percent of the T resin, and 0.5 weight percent of dioctyltin carboxylate catalyst, Reaxis™ 318 available from Reaxis, Inc., McDonald, Pa. The formulation contained >100 g/L of VOC. The formulation was yellowish and further yellowed after application to a mineral substrate.

Example 4

A mineral surface enhancer composition was prepared similarly to Example 3, but instead of hexamethyldisiloxane, a trimethylsilyl-terminated polydimethylsiloxane fluid with a viscosity of 10 mPa·s was added to lower the viscosity. The formulation was tested and found to be non-yellowing. Mineral surfaces to which the composition showed visual enhancement, particularly with regard to color saturation. and achieved a noticeable wet look.

Example 5

Example 3 was repeated, but the tin catalyst was replaced by a titanate catalyst: Dorf Ketal Tyzor 9000 (tetra t-butyl titanate), Tyzor PITA (titanium ethylacetoacetate complex), and Tyzor TPT (tetraisopropyl titanate) All formulations contained less than 100 g/L VOCs. When applied to mineral surfaces, the compositions did not yellow and provided visual enhancement and a "wet look."

Example 6

Example 4 was repeated, but with the titanium catalyst of Example 5. The enhancer contained less than 100 g/L VOCs. Similar enhancement results were obtained.

The results indicate that the inventive mineral surface enhancers contain low VOC levels, are non-yellowing, and provided good surface enhancement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A mineral surface enhancer which cures when applied to a mineral substrate and having less than 100 g VOC/liter, comprising:
    a) an amino-functional organopolysiloxane fluid having condensable groups prepared by equilibration of one or more aminoorgano-functional organosilicon compounds with a linear or cyclic polydiorganosiloxane or mixture thereof with an equilibration catalyst which is not an alkali metal hydroxide, followed by stripping and/or distillation to remove volatiles,
    b) an organopolysiloxane resin having condensable groups,
    c) optionally, a low viscosity organopolysiloxane fluid, and
    d) a condensation catalyst,
the mineral surface enhancer being substantially water-free.

2. The mineral surface enhancer of claim 1, wherein the equilibration catalyst comprises one or more tetraalkylammonium hydroxides or tetraalkylphosphonium hydroxides.

3. The mineral surface enhancer of claim 1, wherein the organo groups of the amino-functional organopolysiloxane are methyl groups.

4. The mineral surface enhancer of claim 1, wherein the organo groups of the amino-functional organopolysiloxane are methyl groups and at least one $C_{6-20}$ alkyl group.

5. The mineral surface enhancer of claim 1, wherein the organopolysiloxane resin comprises one or more T resins, MT resins, MQ resins, or MQT resins.

6. The mineral surface enhancer of claim 1, wherein the condensable groups of the organopolysiloxane resin comprise silicon-bonded hydroxy or alkoxy groups or mixtures thereof.

7. The mineral surface enhancer of claim 1, prepared by a process comprising mixing component a) with component b), and stripping the resulting mixture to remove volatiles.

8. The mineral surface enhancer of claim 1, which contains a volatile organic solvent.

9. The mineral surface enhancer of claim 8, wherein the volatile organic solvent is a VOC-exempt solvent.

10. The mineral surface enhancer of claim 1 which is non-yellowing.

11. A method for the enhancement of a mineral substrate, comprising applying to the mineral substrate the mineral surface enhancer of claim 1.

12. A method for the enhancement of a mineral substrate, comprising applying to the mineral substrate the mineral surface enhancer of claim 2.

13. A method for the enhancement of a mineral substrate, comprising applying to the mineral substrate the mineral surface enhancer of claim 3.

14. A method for the enhancement of a mineral substrate, comprising applying to the mineral substrate the mineral surface enhancer of claim 4.

15. A method for the enhancement of a mineral substrate, comprising applying to the mineral substrate the mineral surface enhancer of claim 5.

16. A method for the enhancement of a mineral substrate, comprising applying to the mineral substrate the mineral surface enhancer of claim 6.

17. A method of preparing the mineral surface enhancer of claim 1, comprising mixing
    a) an amino-functional organopolysiloxane fluid containing condensable groups prepared by equilibration in the presence of a tetraalkylammonium hydroxide or tetraalkylphosphonium hydroxide catalyst;

b) an organopolysiloxane resin which bears condensable groups and which is liquid or is soluble in the amino-functional organopolysiloxane fluid containing condensable groups;

c) optionally a low viscosity organopolysiloxane fluid, wherein volatiles are removed by distillation or stripping prior to addition of optional component c), to a level of less than 100 g/L of VOCs.

18. The method of claim 17, wherein the amino-functional organopolysiloxane fluid a) is distilled and/or stripped to remove volatiles prior to mixing with the organopolysiloxane resin b), and the mixture is further distilled and/or stripped to remove additional volatiles.

19. The method of claim 17, wherein both the amino-functional organopolysiloxane fluid a) and the organopolysiloxane resin b) are both distilled and/or stripped to remove volatiles prior to mixing with each other, and optionally further distilled and/or stripped to further remove volatiles.

20. The mineral surface enhancer of claim 1, wherein a low viscosity organopolysiloxane fluid is present, and wherein said low viscosity organopolysiloxane fluid is selected from hexamethyldisiloxane and trimethylsilyl-terminated polydimethylsiloxanes.

* * * * *